March 7, 1933.  H. HOLZWARTH  1,899,963
EXPLOSION TURBINE PLANT FOR SHIPS
Filed Jan. 30, 1929
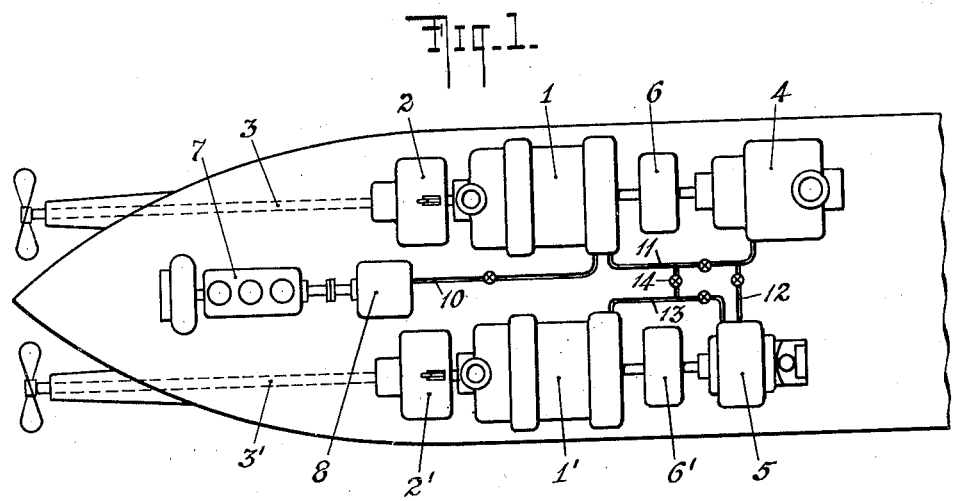
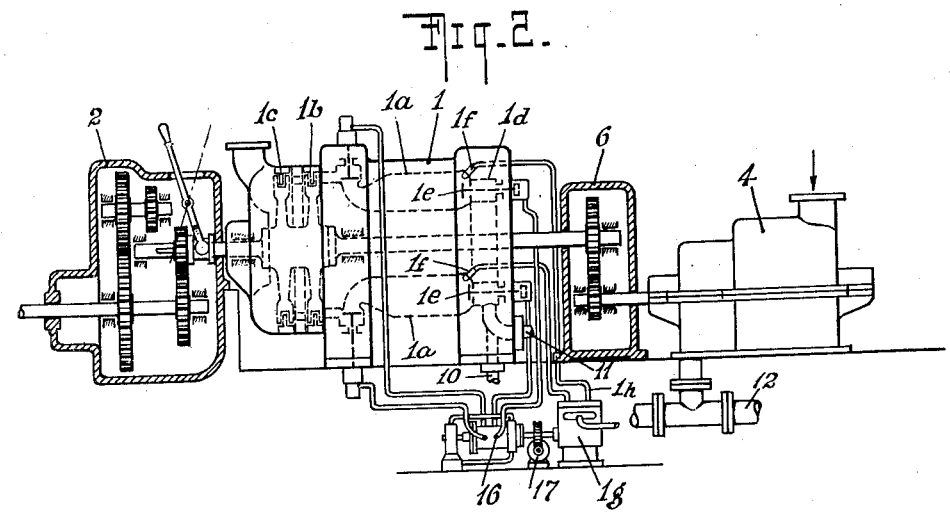
WITNESS
INVENTOR
HANS HOLZWARTH
BY
ATTORNEYS Patented Mar. 7, 1933                                                          1,899,963

UNITED STATES PATENT OFFICE

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE

EXPLOSION TURBINE PLANT FOR SHIPS

Application filed January 30, 1929, Serial No. 336,275, and in Germany February 29, 1928.

My invention relates to marine engines and more particularly to a ship propelling explosion turbine plant for driving a plurality of propeller shafts.

Explosion turbines which are coupled with their air compressors, preferably constructed as turbo-compressors, are highly adapted for the construction of marine power plants of which one of the essential requirements is very high capacity, both for short and for continuously long periods, in comparison with the tonnage of the ship. Such power requirements are made, for instance, by heavy sea-going tugs and by other ships designed for various purposes.

The present invention has for its object to provide a power plant having very large capacity per unit of weight and capable of being set into full capacity operation from a condition of rest within a comparatively short period of time. I accomplish such object by providing a plurality of explosion turbines, a plurality of air compressors, one or more compressors being driven by each turbine, and suitable connections between the compressors and the explosion chambers of the turbines. The several compressors are adapted to generate compressed air at progressively increasing pressures, each higher pressure compressor being fed by the next lower pressure compressor. Each compressor is arranged to charge air to the explosion chambers of the turbine operating the next higher pressure compressor, and may also charge air to its own turbine and to those operating the lower pressure compressors. The turbines are arranged to be set into operation in sequence, the first turbine, which operates the lowest pressure compressor, being started by feeding compressed air from an external source to one or more of its explosion chambers. When the last turbine, to which the highest pressure compressor is coupled, is set into operation, all air connections between the lower pressure compressors and the turbines are closed and the explosion chambers of all of the turbines are charged with air by the highest pressure compressor, upon which the plant attains its full capacity. Each of the compressors may be operatively connected with its associated turbine either directly or through a transmission mechanism or change speed gearing, depending on the relative optimum operating speeds of the same.

In the accompanying drawing is shown diagrammatically a preferred embodiment of the invention.

In said drawing, Fig. 1 is a plan view of a constant volume explosion turbine plant embodying the present invention, and Fig. 2 is an elevation, partly in section, of one of the explosion turbines and its associated mechanism on an enlarged scale.

The numerals 1, 1' indicate two explosion turbines of any suitable construction, such as the impulse and reaction gas turbines described in my United States Patent No. 1,775,527 but preferably of the improved two Curtis wheel construction disclosed in my allowed application Serial No. 322,154, such latter construction being illustrated in Fig. 2 and employing, for example, gas, oil or coal dust as fuel. Such turbines usually include a number of constant volume explosion chambers $1a$ associated with one, two or more turbine stages, such as stages $1b$, $1c$, the chambers being provided with suitably timed and controlled air and fuel valves $1e$ and $1f$ for periodically charging into such chambers mixtures of air and fuel which are exploded therein. The air valves may receive air through a manifold $1d$ such as shown in greater detail in my United States Patent No. 1,672,529. Liquid fuel may be periodically introduced into the chambers $1a$ through the injector valves $1f$ by the pump $1g$ and conduits $1h$, as shown conventionally in Fig. 2. The explosion gases generated by the explosions are discharged by each chamber, upon opening of its nozzle valve, against a turbine rotor. The construction and operation of the constant volume explosion chambers of an explosion turbine of this type are well known and need not be described in detail.

The turbine shafts are connected through transmission and reversing mechanism 2, 2' with propeller shafts 3, 3'. The mechanism 2, 2' may be of any known construction, a conventional form for a turbine-operated vehicle being illustrated, but the same forms no part of the present invention and no novelty is claimed therefor. The speed reduction gearing is shown, for example, on page 1211 of vol. 46 (1924) of the Transactions of the American Society of Mechanical Engineers (H. Zoelly, "The Zoelly Turbine-Driven Locomotive"). A low pressure air compressor 4 and a high pressure air compressor 5 are associated, respectively, with the turbines 1 and 1' and are driven by the turbine shafts through the speed reduction gearings 6, 6', a conventional construction of which is diagrammatically illustrated in Fig. 2. An auxiliary engine, for instance in the form of a high speed Diesel engine 7, is provided which serves to operate a rotary compressor 8. Such an engine is usually already a part of the ship's equipment, and serves to generate current for lighting purposes. The speed reduction gearings 6 and 6' permit the low pressure and high pressure compressors to be driven at the optimum speed for each type of machine.

The compressor 8 is connected to the turbine 1, that is, to the charging-air manifold 1d associated with the combustion chambers thereof, through a valved conduit 10. The low pressure compressor 4 is connected to the turbine 1 by means of a valve-controlled conduit 11 and to the compressor 5 by a valved conduit 12. The compressor 5 charges air under high pressure to both turbines through the valved conduits 13 and 14.

During the motion of the ship the turbines 1 and 1' operate the propeller shafts 3 and 3' through the transmission and reversing mechanism 2 and 2', and also the low pressure and high pressure compressors 4 and 5 through the change speed transmission 6 and 6'. During such motion the turbines 1 and 1' receive their charging air from the high pressure compressor 5, such air being sucked from the atmosphere by the low pressure compressor 4 which then feeds it to the compressor 5 through the conduit 12. If desired, a cooling apparatus (not shown) may be interposed in the conduit 12 to cool the air compressed by compressor 4 before it enters compressor 5.

The operation of the valves of the explosion chambers of the turbines is controlled by a fluid pressure distributor 16 which may be driven by an electric motor 17 independently of the turbine shafts, for instance, as shown in my Patent No. 877,194. The motor 17 may drive also the fuel pump 1g.

The plant is set into operation as follows: The auxiliary engine 7 is set into motion and coupled with the compressor 8. One or more of the explosion chambers associated with the turbine 1 are then fed with charging air from said compressor 8 upon opening of the valve in conduit 10 and in this way the larboard turbine is set into motion. The propeller shaft is not yet coupled to the turbine shaft but the low pressure compressor 4 is coupled thereto. As soon as the compressor 4 is able to charge compressed air, the compressor 8 is cut out and all of the explosion chambers of the larboard turbine 1 are fed from the compressor 4 through conduit 11 and thus set into operation. This turbine then runs at rated speed but with reduced air pressure. The turbine 1' is then driven up to a high speed with the aid of air from the low pressure compressor, the valve in conduit 14 being opened, and finally the air from compressor 4 is switched into compressor 5 through conduit 12, so that from then on charging air at full high pressure is at the disposal of both turbines, the valve in conduit 11 being closed and that in conduit 13 opened. Both turbines are then able to yield their rated capacities. So long as the propeller shafts are not coupled with the turbines running at full speed, a portion of the charging air must be blown off into the atmosphere or else the speed of the turbines must be reduced.

The starting and operation of both of the turbine sections of the plant will be clear from the above description. The comparatively large power plant, it will be seen, is set into operation in a very simple manner and with very simple yet reliable and effective auxiliary mechanism. This is of great importance because my improved marine power plant is thereby very readily set into operation and reaches its full load capacity in a very short time and with the aid of very little human attendance.

Variations may be resorted to within the scope of the appended claims without departing from the spirit of the invention.

I claim:

1. In an explosion turbine power plant, in combination, an explosion turbine having a plurality of explosion chambers, a conduit for conducting air to one or more of said chambers to start said turbine, a low pressure air compressor arranged to be driven by the latter, a second explosion turbine having a plurality of explosion chambers, a high pressure air compressor arranged to be driven by said second turbine, said compressors being adapted to compress air for charging the explosion chambers of both said turbines, and air conduits between each of said compressors and the chambers of each of said turbines.

2. In an explosion turbine power plant, in combination, a plurality of independently mounted turbines, each having one or more explosion chambers associated therewith, a plurality of air compressors driven by such turbines and operative to deliver air in succession at progressively higher pressures, an air connection between each lower pressure compressor and the chambers of the turbine driving the next higher pressure compressor, and air connections between the highest pressure compressor and the explosion chambers of all of said turbines.

3. An explosion turbine power plant as set forth in claim 2 including an air connection between each compressor and the next higher pressure compressor, whereby each of the lower pressure compressors feeds compressed air to the next higher pressure compressor.

4. In an explosion turbine power plant, in combination, an explosion turbine having a plurality of explosion chambers, a conduit for conducting air to at least one of said chambers to support explosions therein to start said turbine, a low pressure air compressor arranged to be driven by the latter, a second explosion turbine having a plurality of explosion chambers, a high pressure air compressor arranged to be driven by said second turbine, an air conduit between the low pressure compressor and the explosion chambers of the second turbine, and air conduits between the high pressure compressor and the explosion chambers of both of said turbines.

5. An explosion turbine as set forth in claim 4 including a connection between the two compressors for charging low pressure air from the low pressure compressor into the high pressure compressor.

6. The combination set forth in claim 1, including a connection between the low pressure compressor and the high pressure compressor for conducting to the latter the air compressed by the low pressure compressor.

HANS HOLZWARTH.